(12) United States Patent
Kashihara et al.

(10) Patent No.: US 6,829,418 B2
(45) Date of Patent: Dec. 7, 2004

(54) OPTICAL WAVEGUIDE CIRCUIT DEVICE

(75) Inventors: Kazuhisa Kashihara, Chiyoda-ku (JP); Yoshinobu Nekado, Chiyoda-ku (JP); Kazutaka Nara, Chiyoda-ku (JP); Tunetoshi Saito, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 161 days.

(21) Appl. No.: 09/955,120

(22) Filed: Sep. 19, 2001

(65) Prior Publication Data

US 2002/0034361 A1 Mar. 21, 2002

(30) Foreign Application Priority Data

Sep. 20, 2000 (JP) ..................................... 2000-285380

(51) Int. Cl.[7] .............................................. G02B 6/26
(52) U.S. Cl. .......................................... 385/50; 385/37
(58) Field of Search ............................. 385/10, 37, 50, 385/39, 31, 65–71, 83, 52, 14, 34, 73

(56) References Cited

U.S. PATENT DOCUMENTS

| | | | | |
|---|---|---|---|---|
| 5,546,483 A | * | 8/1996 | Inoue et al. | 385/14 |
| 6,072,920 A | * | 6/2000 | Ando et al. | 385/11 |
| 6,222,963 B1 | * | 4/2001 | Grand et al. | 085/39 |
| 6,377,723 B1 | * | 4/2002 | Saito et al. | 385/15 |
| 6,501,896 B2 | * | 12/2002 | Nara et al. | 385/129 |
| 6,549,696 B1 | * | 4/2003 | Uetsuka et al. | 385/24 |

FOREIGN PATENT DOCUMENTS

| | | | | |
|---|---|---|---|---|
| JP | 49-41953 | 11/1974 | | |
| JP | 62-105446 | 5/1987 | | |
| JP | 4-241304 | 8/1992 | | |
| JP | 59-152638 | 8/1994 | | |
| JP | 7-113923 | 5/1995 | | |
| JP | 8-139339 | 5/1996 | | |
| JP | 11218639 A | * | 8/1999 | ............ G02B/6/12 |
| JP | 2000-241656 | 9/2000 | | |
| JP | 2003050324 A | * | 2/2003 | ............ G02B/6/12 |
| WO | WO 98/13718 | 4/1998 | | |

* cited by examiner

*Primary Examiner*—Frank G. Font
*Assistant Examiner*—Kaveh C Kianni
(74) *Attorney, Agent, or Firm*—Oblon, Spivak, McClelland, Maier & Neustadt, P.C.

(57) ABSTRACT

An optical waveguide circuit device strong in impact strength in dropping, etc. is provided. A waveguide pattern is formed on a silicon substrate in this optical waveguide circuit device. For example, this waveguide pattern has an optical input waveguide, a first slab waveguide, an arrayed waveguide including a plurality of channel waveguides having lengths different from each other and arranged side by side, a second slab waveguide, and a plurality of optical output waveguides arranged side by side. The first slab waveguide is separated on a cross separating face crossing an optical path passing the first slab waveguide. A temperature dependence in light transmission central wavelength of an arrayed waveguide grating is reduced by sliding and moving a separating slab waveguide side by a slide moving member along the separating face depending on temperature. The cross separating face and a noncross separating face communicated with this cross separating face are set to faces not conformed to a cleavage plane of the substrate.

2 Claims, 5 Drawing Sheets

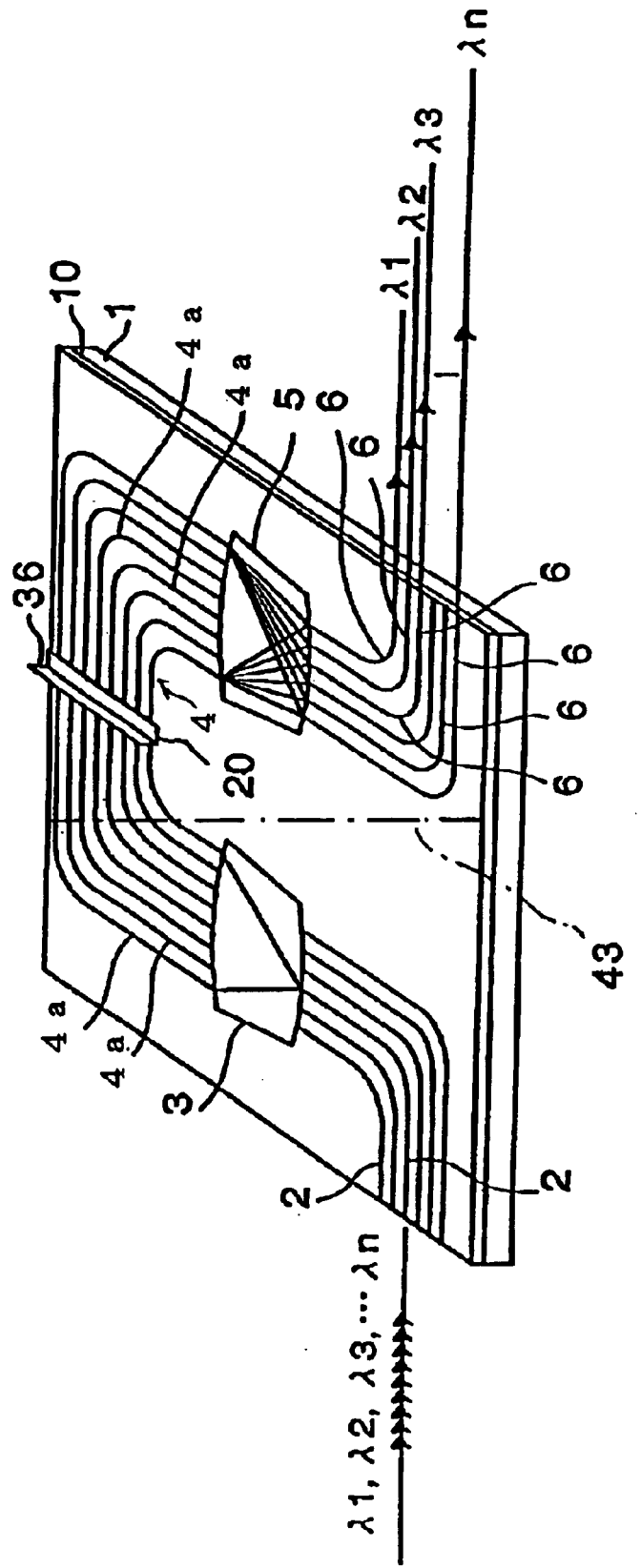

OPTICAL WAVEGUIDE CIRCUIT DEVICE

BACKGROUND OF THE INVENTION

An optical waveguide circuit device having a waveguide formed from a core such as shown in FIG. 4 is used in various uses in an optical communication field. This waveguide is generally formed from a silica-based glass on the substrate. In the optical waveguide circuit device of this kind, various functions can be fulfilled by a difference in the waveguide. The substrate of a single crystal such as a silicon substrate, etc. is generally used as the above substrate.

SUMMARY OF THE INVENTION

The present invention provides a novel optical waveguide circuit device. The optical waveguide circuit device of the invention comprises:

a substrate having a cleavage plane;

a waveguide formed from a core on said substrate; and an incision line constructed by a groove or (and) a separating slit formed by crossing at least one portion of the core of said waveguide;

wherein a face of said incision line is set to a face different from the cleavage plane of said substrate.

BRIEF DESCRIPTION OF THE DRAWINGS

Exemplary embodiments of the invention will now be described in conjunction with drawings in which:

FIG. 4 is an explanatory view of an optical waveguide circuit device in another embodiment of the invention.

DETAILED DESCRIPTION

In one proposed example of an optical waveguide circuit device, a groove crossing at least one portion of a core is formed and an optical component such as a filter, etc. is inserted into this groove.

In the device of this kind, performance of this optical device can be fulfilled by inserting the optical component into a groove portion. However, for example, when a package is dropped in error in a state in which the optical waveguide circuit device is stored into the package, there is a possibility that a crack is caused in a substrate and a waveguide forming region with a forming portion of the groove as a starting point.

The present invention provides an optical waveguide circuit device in which no crack, etc. are caused in the substrate and the waveguide forming region in case it is dropped, even when the optical waveguide circuit device has a constructional portion such as a groove, etc. in one aspect of the invention.

Figure 2A:
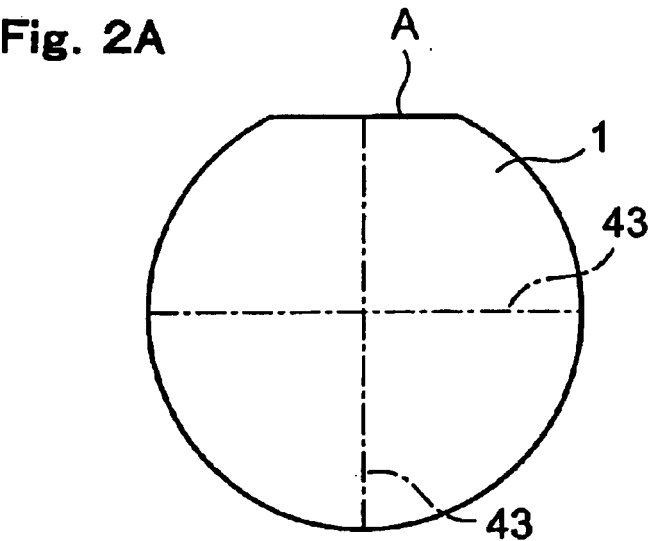
FIG. 2A is an explanatory view of a cleavage plane of a silicon substrate.

A single crystal has characteristics in which the single crystal is cracked along certain specific crystallographic axis. This phenomenon is called cleavage. This cracking face is called a cleavage plane. For example, in the case of a silicon substrate formed in an orientation flat position (110) in a crystal plane <100>, the cleavage plane 43 is formed horizontally or perpendicularly to an orientation flat A of a silicon substrate 1 as shown in FIG. 2A.

The substrate of the optical waveguide circuit device is generally constructed by a silicon single crystal, etc. As is well known, there is a cleavage plane in the single crystal substrate of this kind. The present inventor noticed the position relation of the cleavage plane of this substrate and a constructional element relatively weak in impact strength such as a groove, a separating slit, etc. formed on the substrate. Therefore, the present inventor made plural samples having faces (inner wall faces) of the groove and the separating slit conformed to the cleavage plane of the silicon single crystal substrate, and also made plural samples having faces (inner wall faces) of the groove and the separating slit not conformed to the cleavage plane of the silicon single crystal substrate. An impact test of these samples of each optical waveguide circuit device was then made.

This impact test was made in a state in which the optical waveguide circuit device was stored into the package.

As a result, when the above faces of the groove and the separating slit are formed in conformity with the cleavage plane of the substrate, there is a case in which a crack, etc. are caused in the waveguide forming region. In contrast to this, when the faces of the groove and the slit are set to faces not conformed to the cleavage plane of the substrate, it can be confirmed that a crack, etc. are not caused in the substrate and the waveguide forming region in case it is dropped.

One embodiment of the optical waveguide circuit device not easily causing the crack due to such a dropping impact will next be explained.

Figure 1:
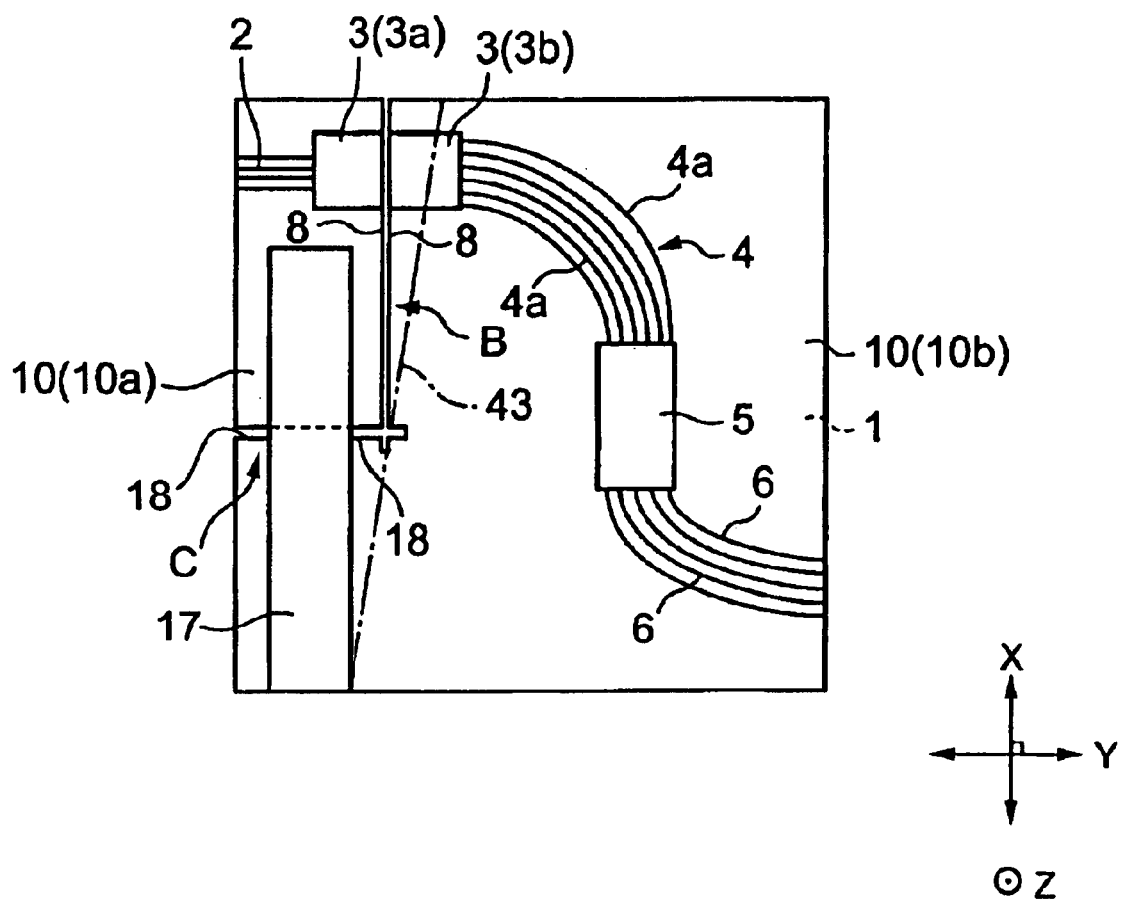
FIG. 1 is an explanatory view showing the construction of an optical waveguide circuit device in one embodiment of the invention.

FIG. 1 is a plan view showing the construction of an optical waveguide circuit device in one embodiment of the present invention.

As shown in this figure, the optical waveguide circuit device is an arrayed waveguide grating type optical multiplexer/demultiplexer having a core of a waveguide on a substrate 1 of a silicon single crystal.

This waveguide is formed by including one or more optical input waveguides 2, a first slab waveguide 3 connected to output ends of this optical input waveguides 2, an arrayed waveguide 4 connected to an output end of the first slab waveguide 3, a second slab waveguide 5 connected to an output end of the arrayed waveguide 4, and a plurality of optical output waveguides 6 connected to an output end of the second slab waveguide 5 arranged side by side.

The arrayed waveguide 4 propagates light emitted from the first slab waveguide 3. The lengths of channel waveguides 4a adjacent to each other within the arrayed waveguide 4 are set to be different from each other by a set amount. For example, the lengths of the adjacent channel wavelengths 4a are different from each other by ΔL. For example, the optical output waveguides 6 regionrranged in accordance with the number of signal lights having wavelengths different from each other and demultiplexed or multiplexed by an arrayed waveguide grating. For example, a plurality of channel waveguides 4a such as 100 channel waveguides constituting the arrayed waveguide 4 are normally arranged. However, in FIG. 1, the number of channel waveguides 4a and the number of optical output waveguides 6 are schematically shown. Further, the number of optical input waveguides 2 is not limited to a number shown in FIG. 1.

In the optical waveguide circuit device of one embodiment, separating slab waveguides 3a, 3b are formed by separating the first slab waveguide 3. The separating face is formed to cross an optical path passing the first slab waveguide 3.

The cross separating face 8 is formed by a separating slit as an incision line extending from one end side (an upper end side of FIG. 1) of the substrate 1 and crossing the first slab waveguide 3 and reaching an intermediate portion of the substrate 1. A noncross separating face 18 not crossing the first slab waveguide 3 is similarly formed by the separating slit as an incision line in communication with a tip side of the cross separating face 8 crossing the first slab waveguide 3. In the example shown in FIG. 1, the noncross separating face 18 is perpendicular to the cross separating face 8, but both these separating faces 8 and 18 may not be set to be perpendicular to each other.

In this embodiment, the substrate 1 is separated into a first waveguide forming region 10a including a separating slab waveguide 3a on one side and a second waveguide forming region 10b including a separating slab waveguide 3b on the other side by the cross separating face 8 and the noncross separating face 18.

Since the first waveguide forming region 10a and the second waveguide forming region 10b are separated from each other by the separating slit, these forming regions are spaced from each other. For example, the space of a C-portion shown in FIG. 1 (the distance between the noncross separating faces 18) is about 100 µm, and the space of a B-portion (the distance between the cross separating faces 8) is about 25 µm. Both these separating faces 8, 18 are set to faces different from the cleavage plane 43.

In this embodiment, a slide moving member 17 moves the first waveguide forming region 10a along the cross separating face 8 with respect to the second waveguide forming region 10b depending on temperature of the arrayed waveguide grating. The slide moving member 17 reduces light transmitting central wavelength temperature dependence of the arrayed waveguide grating by this slide moving operation.

In one example, the slide moving member 17 is formed by a metal plate such as a copper plate having a coefficient of thermal expansion larger than that of the substrate 1. The coefficient of thermal expansion of copper is $1.65 \times 10^{-5}$ (1/K). Unillustrated solder is formed on a lower side of the slide moving member 17 on its both end sides. An unillustrated metallic film is formed on the waveguide forming region on a lower side of this solder. One end side of the slide moving member 17 is fixed to the waveguide forming region 10a and the other end side of the slide moving member 17 is fixed to the waveguide forming region 10b through this metallic film and the solder.

In one embodiment, as mentioned above, the first slab waveguide 3 of the arrayed waveguide grating type optical multiplexer/demultiplexer is separated into separating slab waveguides 3a, 3b. The separating slab waveguide 3a is slid and moved by the slide moving member 17 along the cross separating face (separating face) 8 depending on temperature. Thus, a light transmission central wavelength of the arrayed waveguide grating type optical multiplexer/demultiplexer is shifted depending on temperature.

In this embodiment, the cross separating face 8 is set to a face not conformed to the cleavage plane 43 of the substrate 1. Further, the noncross separating face 18 communicated with the cross separating face 8 is also set to a face not conformed to the cleavage plane 43 of the substrate 1.

Figure 2B:
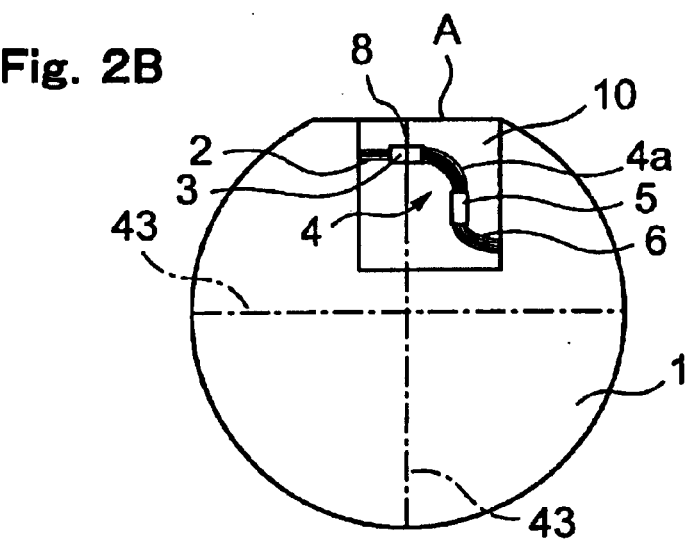
FIGS. 2B and 2C are views for explaining the cleavage plane of the silicon substrate and an arrangement design example of an arrayed waveguide grating type optical multiplexer/demultiplexer formed on this substrate.
Figure 2C:
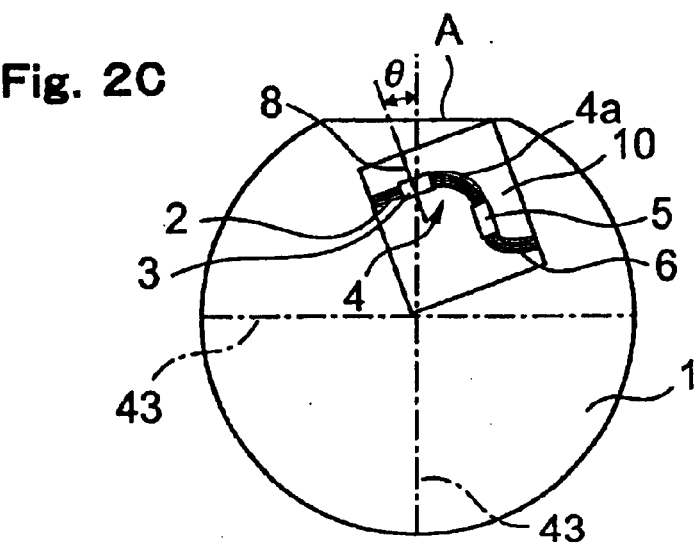

Thus, in the embodiment shown in FIG. 1, the cross separating face 8 is slantingly formed such that an angle θ formed by the cross separating face 8 and the orientation flat A of the substrate 1 is set to 20° as shown in FIG. 2C so as to set the cross separating face 8 and the noncross separating face 18 to faces not conformed to the cleavage plane 43 of the substrate 1. As shown in FIG. 2B, when the cross separating face 8 is formed perpendicularly to the orientation flat A of the substrate 1, the cross separating face 8 becomes a face conformed to the cleavage plane 43 of the substrate 1, which is not preferable.

Figure 3A:
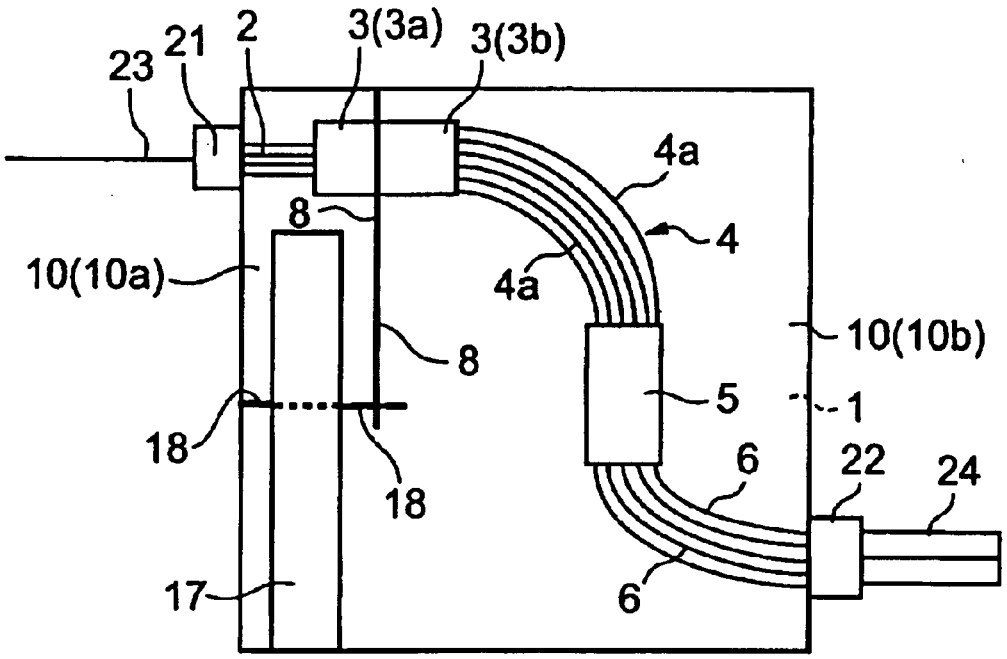
FIGS. 3A, 3B, 3C and 3D are explanatory views of an optical module manufacturing process of one embodiment of the invention.

The optical waveguide circuit device is first formed as an optical module as follows to evaluate a dropping impact strength of the optical waveguide circuit device in this embodiment. Namely, plural optical waveguide circuit devices each constructed in the above embodiment are formed. In each optical waveguide circuit device, as shown in FIG. 3A, an optical fiber 23 of an optical fiber array 21 is next optically connected to an incident end of the optical input waveguide 2 of the optical waveguide circuit device. An optical fiber of an optical fiber ribbon 24 fixed to the optical fiber array 22 is optically connected to an output end of each optical output waveguide 6.

Figure 3B:
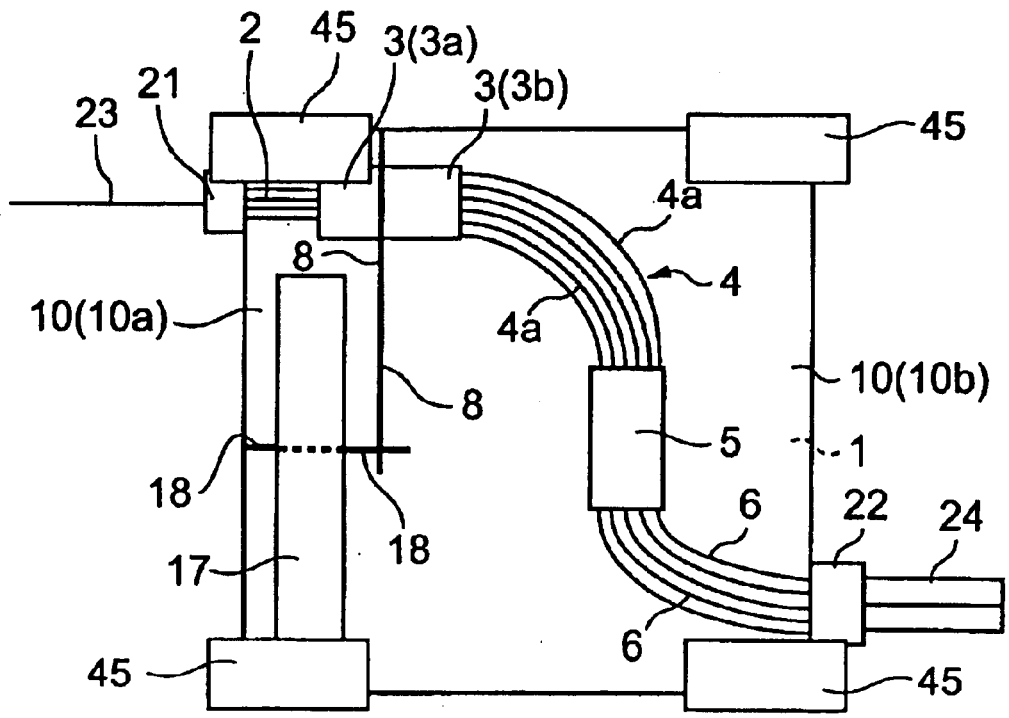
Figure 3C:
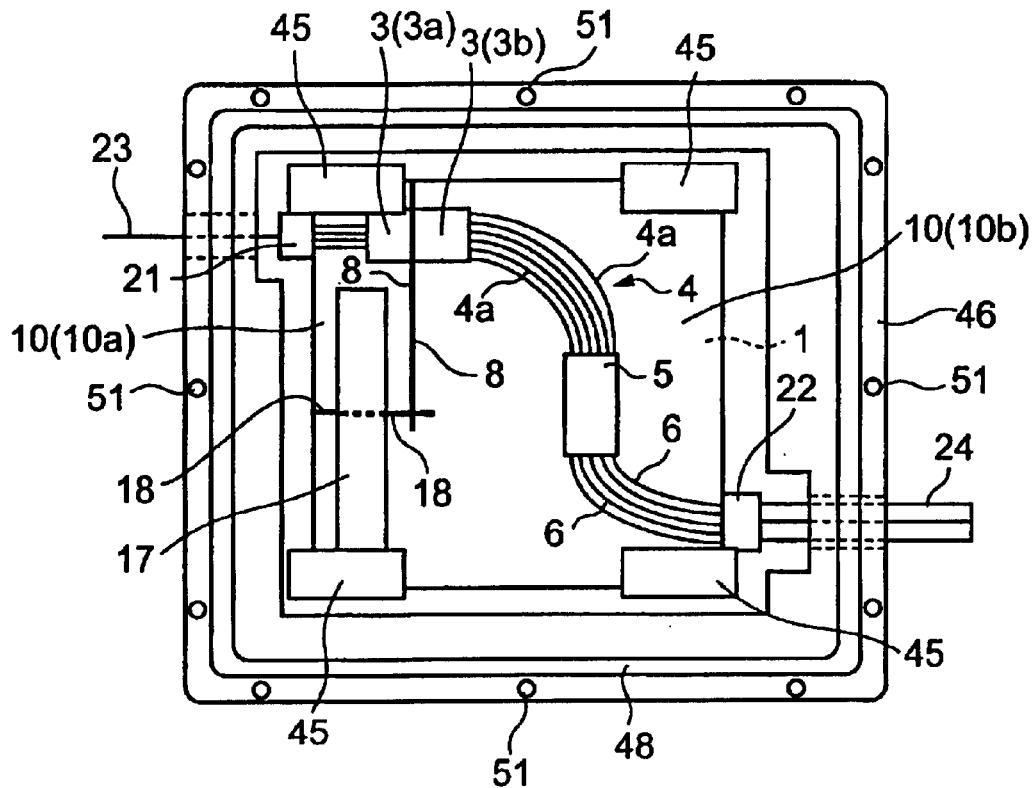
Figure 3D:
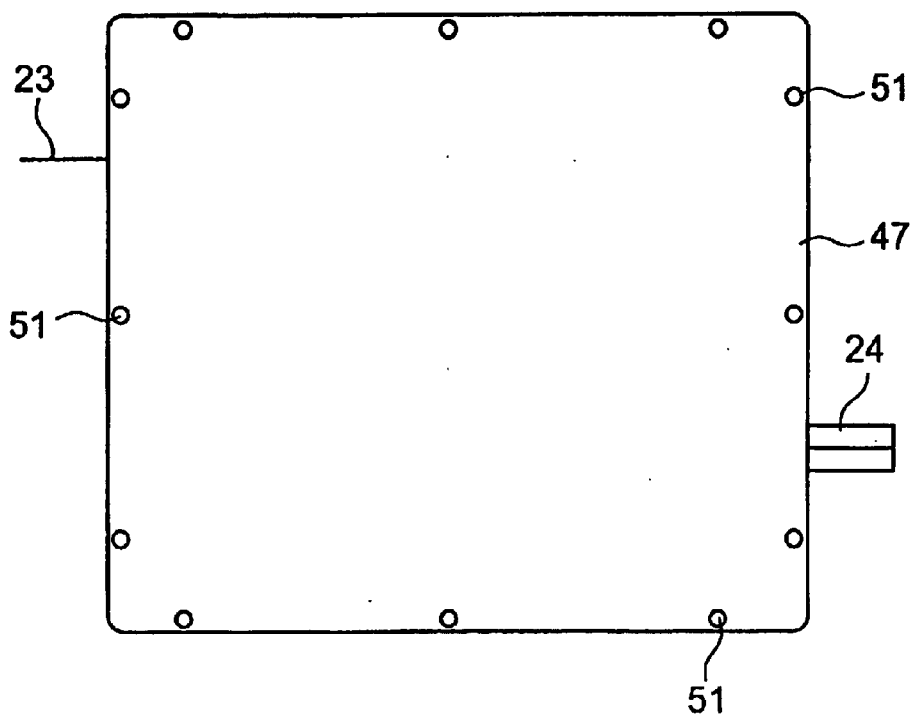

Viton rubber 45 nipping the optical waveguide circuit device from a surface side of the waveguide forming region 10 and region side of the substrate 1 is next arranged at each of four corners of the optical waveguide circuit device as shown in FIG. 3B, and is stored into a package 46 as shown in FIG. 3C. In this state, a matching oil is injected into the package 46, and an O-ring is mounted to an O-ring fitting groove 48. Further, as shown in FIG. 3D, a cover 47 is fastened by screws. Then, the cover 47 is fixed by the screws, and the optical waveguide circuit device is sealed within the package 46 and is thus formed as an optical module.

An impact is applied to the package 46 at an impact acceleration of 100 G (1G=9.8 m/s$^2$) on the supposition of an impact under a general treating by using an impact tester (AVCO impact tester, AVEX CORP. USA, MODEL SM-105-MP). Thus, the impact test of the above optical module was made.

As a result of this impact test, no optical waveguide circuit device is cracked, etc.

As mentioned above, it is possible to construct an optical waveguide circuit device strong in impact strength in dropping, etc. by setting the cross separating face 8 and the noncross separating face 18 formed in the optical waveguide circuit device to faces not conformed to the cleavage plane 43 of the substrate 1.

The invention is not limited to the above embodiment, but various embodiment modes can be adopted. For example, in the above embodiment, the angle θ formed by the cross separating face 8 and the cleavage plane 43 is set to 20°. However, this angle with respect to the cleavage plane 43 is not particularly limited, but is suitably set.

In the above embodiment, the cross separating face 8 is formed by crossing the first slab waveguide 3, but may be also formed by crossing the second slab waveguide 5.

In this case, a similar operation is performed by arranging a slide moving member 17 having a function similar to that in the above embodiment. It is possible to construct an optical waveguide circuit device strong in impact strength by setting the separating face to a face not conformed to the cleavage plane 43 of the substrate 1.

Further, for example, as shown in FIG. 4, a groove 20 as an incision line can be formed in a mode crossing the arrayed waveguide 4 instead of the formation of the separating face in the slab waveguide. In the example of FIG. 4, a half-wave plate 36 is arranged in the groove 20. In this construction, similar to the embodiment shown in FIG. 1, it is possible to construct an optical waveguide circuit device strong in impact strength by setting an inner wall face of the groove 20 to a face not conformed to the cleavage plane 43 of the substrate 1. Separating faces 8, 18 similar to those in the case of FIG. 1 may be also formed in the construction of FIG. 4.

The incision line of the groove, the separating slit, etc. may be also formed by cutting work such as dicing, and etching, and may be also formed by using the other techniques.

Further, no optical waveguide circuit device of the invention is necessarily limited to the arrayed waveguide grating type optical multiplexer/demultiplexer. In short, in the optical waveguide circuit device of various waveguides in which a waveguide having a core and a cladding is formed in the waveguide forming region (glass layer) 10 on the substrate 1, the invention can be applied to the optical waveguide circuit device in which a groove and/or a slit crossing at least one portion of a core within the waveguide are formed. Similar to the above embodiment, it is possible to construct an optical waveguide circuit device strong in impact strength by setting inner wall faces of the groove and the slit to faces not conformed to the cleavage plane of the substrate.

What is claimed is:

1. A core of a waveguide of an optical waveguide circuit device, which is a core of an arrayed waveguide grating optical multiplexer/demultiplexer, said optical waveguide circuit device including a substrate having a cleavage plane formed at least one of horizontally and perpendicularly to an orientation flat;

a waveguide formed from a core on said substrate; and an incision line constructed by a groove or/and a separating slit formed by crossing at least one portion of the core of said waveguide;

wherein a face of said incision line is formed at an arbitrary angle with respect to the cleavage plane of said substrate, said optical multiplexer/demultiplexer comprising:

one or more optical input waveguides arranged side by side;

a first slab waveguide connected to output ends of said optical input waveguides;

an arrayed waveguide connected to an output end of said first slab waveguide and including a plurality of channel waveguides arranged side by side for transmitting light that has traveled through said first slab waveguide, said channel waveguides having different predetermined length;

a second slab waveguide connected to an output end of said arrayed waveguide; and a plurality of optical output waveguides arranged side by side and connected to an output end of said second slab waveguide;

wherein the incision line is set to a separating slit for separating at least one of said first and second slab waveguides; the separating slit is formed to cross an optical path of at least one of said first and second slab waveguides;

a slide moving member slides and moves at least one side of the separating slab waveguide separated with this separating slit along said separating face depending on a temperature of AWG; and a light transmission central wavelength of an arrayed waveguide grating type optical multiplexer/demultiplexer is shifted by a slide moving operation of said slide moving member depending on the temperature.

2. The optical multiplexer/demultiplexer according to claim 1, wherein:

said cleavage plane and the face of said incision line are formed so as to set an angle therebetween to 20°.

* * * * *